(12) United States Patent
Pattinson et al.

(10) Patent No.: US 6,591,229 B1
(45) Date of Patent: Jul. 8, 2003

(54) METROLOGY DEVICE WITH PROGRAMMABLE SMART CARD

(75) Inventors: Neville Pattinson, Austin, TX (US); Tibor Somogyi, Verrieres le Buisson (FR); Jean-Marc Pietrzyk, Paris (FR); Bertrand Du Castel, Austin, TX (US)

(73) Assignee: Schlumberger Industries, SA (FR)

( * ) Notice: Subject to any disclaimer, the term of this patent is extended or adjusted under 35 U.S.C. 154(b) by 0 days.

(21) Appl. No.: 09/169,396

(22) Filed: Oct. 9, 1998

(51) Int. Cl.[7] .............................................. G06F 17/00
(52) U.S. Cl. ........................ 702/189; 702/61; 702/62; 235/376
(58) Field of Search .......................... 702/189, 57, 61, 702/63, 68, 80, 122, 123, 127, 183, 188, FOR 103, FOR 104, FOR 134, FOR 170, FOR 171; 235/382, 492, 380, 375, 376, 485; 705/66, 41, 65, 412, 60, 63; 713/172; 711/115; 717/1–3, 7, 11; 455/558, 557; 340/5.6; 902/26; 725/31; 324/110, 103 R, 113, 116, 140 R, 141, 142

(56) References Cited

U.S. PATENT DOCUMENTS

| | | | |
|---|---|---|---|
| 3,977,785 A | 8/1976 | Harris | 355/133 |
| 4,168,396 A | 9/1979 | Best | 713/190 |
| 4,256,955 A | 3/1981 | Giraud et al. | 235/380 |
| 4,278,837 A | 7/1981 | Best | 713/190 |
| 4,465,901 A | 8/1984 | Best | 713/190 |
| 4,562,306 A | 12/1985 | Chou et al. | 713/200 |
| 4,598,810 A | 7/1986 | Shore et al. | 194/205 |
| 4,634,807 A | 1/1987 | Chorley et al. | 705/55 |
| 4,650,975 A | 3/1987 | Kitchener | 235/375 |
| 4,688,169 A | 8/1987 | Joshi | 713/200 |
| 4,725,079 A | 2/1988 | Koza et al. | 283/73 |
| 4,748,561 A | 5/1988 | Brown | 711/164 |
| 4,777,355 A | 10/1988 | Takahira | 235/380 |
| 4,797,543 A | 1/1989 | Watanabe | 235/492 |
| 4,877,947 A | 10/1989 | Mori | 235/381 |
| 4,890,319 A | 12/1989 | Seth-Smith et al. | 380/202 |
| 4,890,321 A | 12/1989 | Seth-Smith et al. | 380/231 |
| 4,926,480 A | 5/1990 | Chaum | 705/69 |

(List continued on next page.)

FOREIGN PATENT DOCUMENTS

| | | |
|---|---|---|
| EP | 0 356 237 A2 | 2/1990 |
| EP | 0 380 377 A1 | 8/1990 |
| EP | 0 427 465 A2 | 5/1991 |

(List continued on next page.)

OTHER PUBLICATIONS

Translation of EP–0 662 674–A1, pp. 1–15.*
"CyberCash", CyberCash, Inc., Home Page (Internet Feb. 1997), 2 pages.

(List continued on next page.)

*Primary Examiner*—Hal Wachsman
(74) *Attorney, Agent, or Firm*—Straub & Pokotylo; Michael Straub

(57) ABSTRACT

A metrology device incorporates a programmable smart card. The smart card may be a Java programmable smart card and allows the metrology device to access Java applications and resources while still retaining independent control over its metrological functions. A smart card interface allows the smart card and metrological device to communicate with each other using the ISO 7816 protocol. The smart card may be external to the metrology device, or it may be fixedly installed in the metrology device. Java applications may be pre-loaded or downloaded on the smart card. The metrological device may select which applications to be run on the smart card. The smart card may have an enhanced operating system that includes various metrological functions as native functions. Alternatively, the metrological functions may be included as part of a Java class library which may be accessed by the operating system or Java applications.

8 Claims, 6 Drawing Sheets

U.S. PATENT DOCUMENTS

| | | | |
|---|---|---|---|
| 4,937,740 A | 6/1990 | Agarwal et al. | 364/200 |
| 5,064,999 A | 11/1991 | Okamoto et al. | 235/379 |
| 5,068,894 A | 11/1991 | Hoppe | 713/172 |
| 5,123,045 A | 6/1992 | Ostrovsky et al. | 713/190 |
| 5,195,130 A | 3/1993 | Weiss et al. | 379/98 |
| 5,247,575 A | 9/1993 | Sprague et al. | 705/53 |
| 5,375,240 A | 12/1994 | Grundy | 713/200 |
| 5,386,369 A | 1/1995 | Christiano | 364/464.01 |
| 5,406,380 A | 4/1995 | Teter | 358/332 |
| 5,412,191 A | 5/1995 | Baitz et al. | 705/5 |
| 5,420,405 A | 5/1995 | Chasek | 235/379 |
| 5,440,631 A | 8/1995 | Akiyama et al. | 705/53 |
| 5,444,779 A | 8/1995 | Daniele | 399/366 |
| 5,448,045 A | 9/1995 | Clark | 235/382 |
| 5,461,217 A | 10/1995 | Claus | 235/380 |
| 5,500,517 A | 3/1996 | Cagliostro | 235/486 |
| 5,509,070 A | 4/1996 | Schull | 705/54 |
| 5,530,520 A | 6/1996 | Clearwater | 399/366 |
| 5,532,920 A | 7/1996 | Hartrick et al. | 707/500 |
| 5,537,474 A | 7/1996 | Brown et al. | 380/23 |
| 5,544,086 A | 8/1996 | Davis et al. | 364/408 |
| 5,550,919 A | 8/1996 | Kowalski | 380/23 |
| 5,590,197 A | 12/1996 | Chen et al. | 380/24 |
| 5,604,802 A | 2/1997 | Holloway | 380/24 |
| 5,613,012 A | 3/1997 | Hoffman et al. | 382/115 |
| 5,650,761 A | 7/1997 | Gomm et al. | 235/381 |
| 5,689,565 A | 11/1997 | Spies et al. | 380/25 |
| 5,692,132 A | 11/1997 | Hogan | 395/227 |
| 5,710,706 A | 1/1998 | Markl et al. | 705/409 |
| 5,734,150 A | 3/1998 | Brown et al. | 235/381 |
| 5,742,756 A | 4/1998 | Dillaway et al. | 395/186 |
| 5,761,306 A | 6/1998 | Lewis | 380/21 |
| 5,768,419 A | 6/1998 | Gundlach et al. | 395/187.01 |
| 5,811,771 A | 9/1998 | Dethloff | 235/380 |
| 5,815,657 A | 9/1998 | Williams et al. | 395/186 |
| 5,822,517 A | 10/1998 | Dotan | 395/186 |
| 5,841,866 A | 11/1998 | Bruwer et al. | 380/23 |
| 5,844,218 A | 12/1998 | Kawan et al. | 235/380 |
| 5,844,497 A | 12/1998 | Gray | 340/825.34 |
| 5,889,941 A | 3/1999 | Tushie et al. | 395/186 |
| 5,892,902 A | 4/1999 | Clark | 395/187.01 |
| 5,901,303 A | 5/1999 | Chew | 395/400 |
| 5,915,226 A | 6/1999 | Martineau | 455/558 |
| 5,923,884 A | 7/1999 | Peyret et al. | 395/712 |
| 5,937,068 A | 8/1999 | Audebert | 380/23 |
| 5,942,738 A * | 8/1999 | Cesaire et al. | 235/380 |
| 6,050,486 A * | 4/2000 | French et al. | 235/380 |
| 6,098,891 A * | 8/2000 | Guthery et al. | 235/492 |
| 6,157,966 A * | 12/2000 | Montgomery et al. | 235/380 |
| 6,170,742 B1 * | 1/2001 | Yacoob | 235/280 |

FOREIGN PATENT DOCUMENTS

| | | |
|---|---|---|
| EP | 0 513 847 A2 | 11/1992 |
| EP | 0 662 674 A1 | 7/1995 |
| EP | 0 662 674 A1 * | 7/1995 |
| EP | 0 665 486 A2 | 8/1995 |
| EP | 0 696 121 A1 | 2/1996 |
| EP | 0 717 338 A1 | 6/1996 |
| EP | 0 829 828 A1 | 3/1998 |
| FR | 2 605 770 | 4/1988 |
| FR | 2 667 171 | 3/1992 |
| FR | 2 667 419 | 4/1992 |
| FR | 2 701 133 | 8/1994 |
| GB | 2 191 029 A | 12/1987 |
| GB | 2 261 973 A | 6/1993 |
| JP | 95207400 | 7/1995 |
| WO | WO 96/25724 | 8/1996 |
| WO | WO 98/09257 | 3/1998 |
| WO | WO 98/19237 | 5/1998 |

OTHER PUBLICATIONS

Phillip M. Hallam–Baker, "Micro Payment Transfer Protocol (MPTP) Version 0.1", W3C Working Draft, Nov. 22, 1995.

"Secure Electronic Transaction (SET) Specification", Book 2: Technical Specifications, Draft for Public Comment, Feb. 23, 1996, pp. 1–10; 129–186.

Blaze, M., "High–Bandwidth Encryption with Low–Bandwidth Smartcards", in *Fast Software Encryption: Third Int'l. Workshop* (ed. D. Gollman), Feb. 1996, pp. 33–40.

"The Copyright Website" Home Page (Internet 7/97), 2 pages.

Intellectual Property: The Property of the Mind, The Economist, Jul. 27, 1996, pp. 57–59.

Lehman, B., "Intellectual Property & the Nat'l. Information Infrastructure", U.S. Patent and Trademark Office, Sep. 1995, pp. 177–200.

"CCC Online", Copyright Clearance Center, Inc. (Internet 7/97), 1 page.

"IBM Cryptolope Containers", IBM infoMarket, International Business Machines Corporation (Internet 8/97), 2 pages.

"IBM infoMarket Rights Management Overview", IBM infoMarket, International Business Machines Corporation (Internet 8/97), 5 pages.

"WIBU Systems Copy Protection", WIBU–Systems AG (Internet 2/97), 1 page.

"Microsoft Authenticode", Microsoft Corporation (Internet 2/97), 1 page.

"McAfee Network Security & Management", McAfee Associates Inc. (Internet 2/97), 2 pages.

"SoftLock Services' Home Page", SoftLock Services, Inc. (Internet 2/97), 1 page.

Bruno Struif, "The Use of Chipcards for Electronic Signatures and Encryption", IEEE Proceedings of the VLSI and Computer Peripherals Conference, May 1989, pp. 4–155 4–158.

Stephen T. Kent, "Protecting Externally Supplied Software in Small Computers", Massachusetts Institute of Technology, Sep. 1980, pp. 2–8, 12–39, 67–76 and 212–236.

R. Mori and M. Kawahara, "Superdistribution: The Concept and the Architecture", The Transactions of the IEICE, vol. E73, No. 7, Jul. 1990, pp. 1133–1146.

John Kelsey and Bruce Schneier, "Authenticating Outputs of Computer Software Using a Cryptographic Co–Processor", Proceedings of CARDIS '96, Amsterdam (1996), (No Month).

Federal Information Processing Standards Publication 190, "Annoucing The Guideline For The Use Of Advanced Authentication Technology Alternatives", Sep. 28,1994, pp. 1–52.

Oded Goldreich and Rafail Ostrovsky, "Software Protection and Simulation on Oblivious RAM's", Journal of the ACM, vol. 43, No. 3, May 1996, pp. 431–473.

Trent Jaeger and Aviel D. Rubin, "Protocols for Authenticated Download to Mobile Information Appliances", The University of Michigan, Dept. of Electrical Engineering & Computer Science, Dec. 1995, pp. 1–12.

"Electronic Payment Schemes", Dr. Phillip M. Hallam-Baker, World Wide Web Consortium (Internet Feb. 1997), 4 pages.

"DigiCash", DigiCash bv, Home Page (Internet Feb. 1997), 2 pages.

"NetChex", Netl, Inc., Home Page (Internet Feb. 1997), 1 page.

"Mondex International", Mondex International Limited, Home Page (Internet Feb. 1997), 1 page.

Wingfield et al., "News: Java Brews Trouble for Microsoft", www.javaworld.com/javaworld, Nov. 1995, pp. 1–2.

Blundon, "The Center of the Universe is a Database", www.javaworld.com/javaworld, Jul. 1996, pp. 1–5.

Gosling, "Audio/Video Sequence of Invited Presentations", www.5conf.inria.fr, May 1996, pp. 1–4.

Sandhu et al., "Authentication, Access Control, and Audit", ACM Computing Surveys, vol. 28, No. 1, Mar. 1996, pp. 241–243.

Cheng et al., "Securing the Internet Protocol", Proc. 5th USENIX UNIX Security Symposium, Salt Lake, Utah, 1995, p. 257. No month.

Kung et al., "Developing an Object–Oriented Software Testing and Maintainance Environment", Communications of the ACM, vol. 38, No. 10, Oct. 1995, pp. 75–87.

J–J. Vandewalle and E. Vetillard, "Developing Smart Card-Based Applications Using Java Card", (Aug. 1998), 18 pages.

F. Thiriet, "Why Java Is Hot for Smart Cards", *ID Systems European Edition*, (Jan. 1998) pp. 32–34.

S. B. Guthery, "Java Card: Internet Computing on a Smart Card", downloaded from: http://computer.org/internet, (Jan.–Feb. 1997), 3 pgs.

\* cited by examiner

METROLOGY DEVICE WITH PROGRAMMABLE SMART CARD

The invention relates to metrology devices and, in particular, to a metrology device with a programmable smart card.

BACKGROUND OF THE INVENTION

Metrology devices, or meters, can be used to measure electricity, water, gas, and other commodities, and can be found in metering applications such as parking meters, payphones, weighing machines, etc. A typical metrology device simply measures a duration, frequency, or amount of a particular commodity and reports what was measured.

Referring to FIG. 1, a prior art meter 10 typically has a central control circuit 12 which is connected to a metrology unit 14, an I/O unit 16, and a display unit 18. The control circuit 12 has a meter operating system running thereon which controls the operation of the meter 10. The metrology unit 14 is connected to one or more sensors 20 which detect the commodities to be measured, e.g., electricity. The metrology unit 14 measures the commodity detected by the sensor 20 and makes this information available to the control circuit 12. In some meters, the control circuit 12 actually performs the function of the metrological unit 14 instead of having a separate metrology unit 14 perform the function. The I/O unit 16 typically includes a keypad or buttons and allows a user to input predefined commands to the meter 10. For example, a user wanting to see how much electricity was consumed last month would simply push the appropriate buttons or otherwise enter the appropriate commands, and the control circuit 12 would retrieve the desired information and display it on the display unit 18. The display unit 18 may be, for example, an LED, LCD, or other types of displays.

Typically, the accuracy of each meter is tested and certified by an appropriate certification agency before the device is put into use. The certification is good for the entire life of the meter, which is typically around 10 years. Certification requires formal "type"0 testing of any change to a meter's composition or functionality which may affect the meter's metrological function in order to ensure that there are no adverse effects to the meter's accuracy or performance.

Prior art applications have attempted to add functionality to the applications by adding smart cards. For example, Schlumberger's "GSM" mobile telephone products now have a Java programmable smart card in the handsets to identify subscribers and provide information about their service providers. However, it is the GSM "network" that performs the metrological functions and not the GSM handset. A payphone has been developed by Schlumberger Payphones that has a Java Virtual Machine incorporated within the payphone's operating system which allows the payphone to interpret and run Java applications. However, the Java Virtual Machine is then a part of the payphone's operating system as opposed to being a separate and isolated function. Other applications include utility prepayment meters that have removable smart cards which function as transport devices for payment information and allow entry of payment and tariff into the meter. Smart cards, generally, are used for a variety of applications including electronic game cards, bank cards, and identification badges. The smart cards are typically encased in a tamper-resistant, plastic or metal housing about the size of a credit card and contain one or more embedded integrated circuit devices. The functionality of these smart cards, however, are usually predefined at the time they are manufactured.

It would be advantageous to add secure programmability to a meter in order to expand the meter's functionality without interfering with the meter's metrological functions.

SUMMARY OF THE INVENTION

The invention relates to adding a programmable smart card to a metrology device to expand the device's functionality while still maintaining independent operation of the device.

In general, in one aspect, the invention relates to a metrology device comprising a metrology unit, a control circuit connected to the metrology unit, and a smart card interface connected to the control circuit. The control circuit is configured so as to be able to communicate with a programmable smart card through the interface. In one embodiment, the control circuit is configured to communicate with a Java programmable smart card. In another embodiment, the smart card interface is ISO 7816 compliant. In another embodiment, the smart card interface enables full-duplex communication between the smart card and the control circuit. In another embodiment, the control circuit is able to initiate communication with the smart card. In yet another embodiment, the control circuit is configured to send commands to the smart card. In yet another embodiment, the control circuit is configured to execute commands received from the smart card. In yet another embodiment, the control circuit is configured to select an application to be run on the smart card.

In general, in another aspect, the invention relates to a metrology system comprising a programmable smart card, and a metrology device connected to the smart card and configured to communicate with the smart card. In one embodiment, the metrology device comprises a metrology unit, a control circuit connected to the metrology unit, and a smart card interface connected to the control circuit. In another embodiment, the system further comprises a metrology device housing, wherein the smart card is housed within the housing. In yet another embodiment, the smart card is selectively removable from the housing. In yet another embodiment, the system further comprises a meter operating system that controls the operation of the meter, wherein the meter operating system is isolated from a smart card operating system. In yet another embodiment, the smart card is a Java programmable smart card.

In general, in another aspect, the invention relates to a programmable smart card comprising a storage unit configured to persistently store a program to be run on the smart card, a memory unit configured to temporarily store a program to be run on the smart card, and a microcontroller connected to the storage unit and memory unit and configured to selectively execute a metrology related function. In one embodiment, the smart card is a Java programmable smart card. In another embodiment, the microcontroller executes the metrology related function as a native function. In another embodiment, the microcontroller retrieves the metrology related program from a library of available programs.

In general, in another aspect, the invention relates to a method of operating a metrology device with a smart card, the method comprising initiating communication with the smart card, selecting an application to be run on the smart card, and sending commands to the smart card. In one embodiment, the method further comprises receiving commands from the smart card. In another embodiment, the method further comprises receiving the smart card into the metrology device. In yet another embodiment, the method further comprises performing a metrological function independent of the smart card. In yet another embodiment, the method further comprises providing a result of a metrological function to the smart card. In yet another embodiment, the method further comprises allowing the selected application to run on the smart card independently of the metrology device.

Advantages of the invention include at least the following: the addition of self-contained and secure programmability and functionality to a meter; independent operation of the meter with or without the programmability or functionality; and isolation of the meter's operation system. Other advantages will become apparent from the following description and from the claims.

DETAILED DESCRIPTION OF THE PREFERRED EMBODIMENTS

Throughout the description and the figures, elements that are the same will be accorded the same reference numbers.

Figure 1:
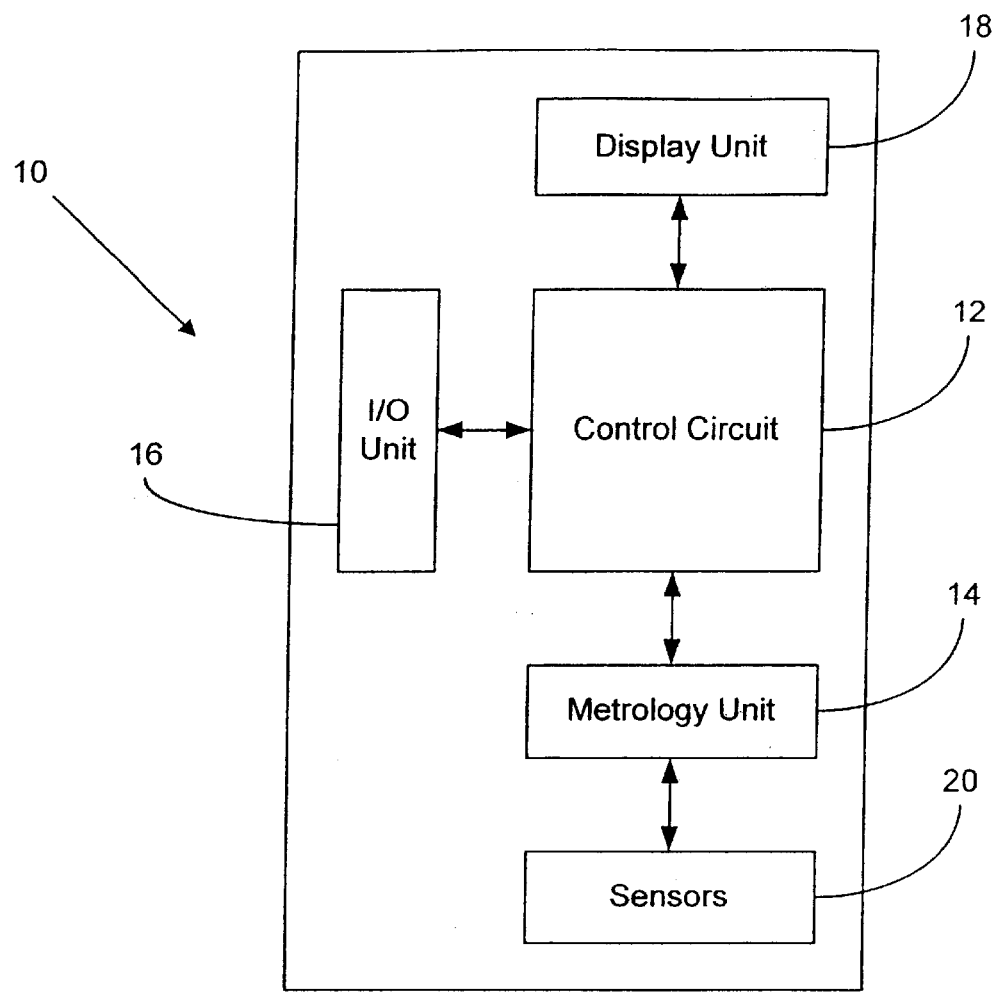
FIG. 1 is a block diagram of a prior art metrology device.
Figure 2:
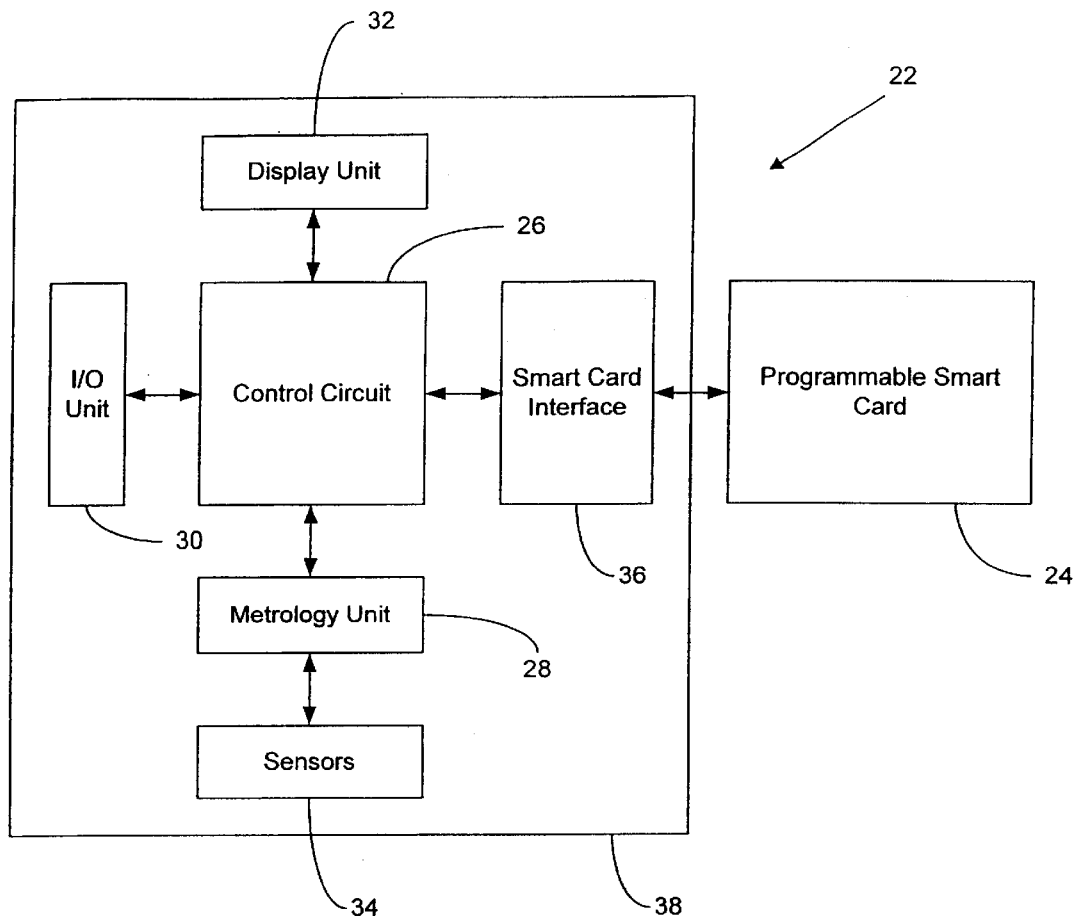
FIG. 2 is a block diagram of a metrology device having an external programmable smart card.

Referring to FIG. 2, a metrology device 22 has a programmable smart card 24 connected thereto. In one embodiment, the smart card 24 is a Java programmable smart card such as the Schlumberger Cyberflex smart card. In other embodiments, the smart card 24 may be programmed or may run applications programmed in other programming languages. The metrology device 22 has a control circuit 26 which is connected to a metrology unit 28, an I/O unit 30, and a display unit 32. The metrology unit 28 has one or more sensors 34 connected thereto for detecting a commodity to be measured, e.g., electricity, water, gas, etc. The control circuit 26 may be a microcontroller, microprocessor, ASIC, PAL, or other integrated circuit device. In another embodiment, the control circuit 26 has a meter operating system running thereon which controls the operation of the metrology device 22.

The metrology device 22 further has a smart card interface 36 which connects the metrology device 22 to the smart card 24. The interface 36 provides the necessary physical and electrical connections between the metrology device 22 and the smart card 24 to allow the metrology device 22 and smart card 24 to communicate with each other. In some embodiments, the interface 36 is ISO 7816 compliant and the metrology device 22 and smart card 24 communicate with each other using the ISO 7816 protocol. Although the ISO 7816 protocol provides for half-duplex communication, in some embodiments, other protocols may be used to provide, for example, full-duplex communication between the metrology device 22 and the smart card 24.

Figure 3:
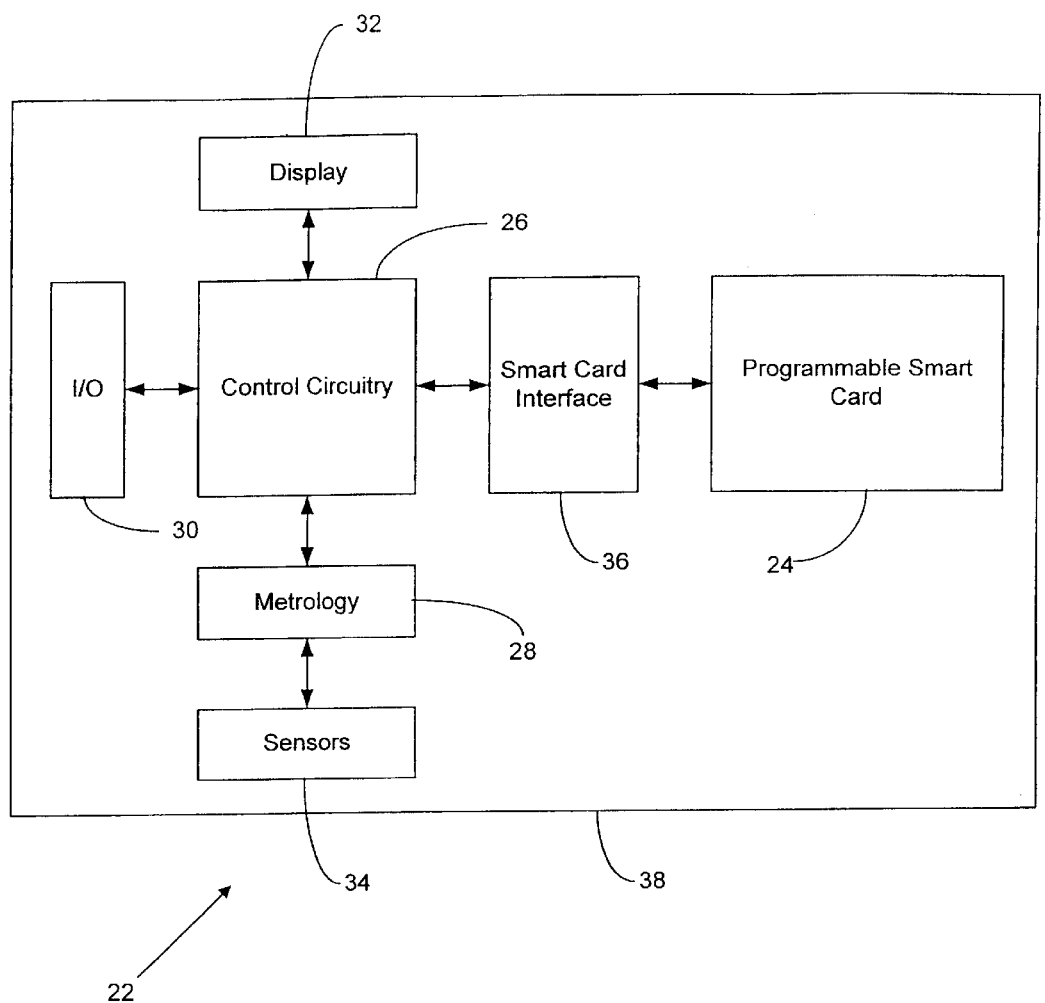
FIG. 3 is a block diagram of a metrology device having an internal programmable smart card.

A metrology device housing 38 houses the metrology device components described above. The housing 38 may be of any size, shape, or configuration to suit a particular metrology application. In one embodiment, the housing 38 does not house the smart card 24, which is selectively insertable into and removable from the metrology device 22. In other embodiments, referring to FIG. 3, the smart card 24 may be fixedly installed or otherwise incorporated within the housing 38 as shown. A power supply (not shown), such as a battery or a mains derived power supply, provides power to the metrology device 22, and also to the smart card 24 when connected to the metrology device 22.

In the case where the smart card 24 is insertable into the metrology device 22, the metrology device 22 is provided with means for recognizing the smart card 24 such as an electronic handshake or other means for acknowledging the smart card 24. In a preferred embodiment, such means is compliant with the ISO 7816 protocol.

In operation, the smart card 24 provides a secure, tamper-resistant, and isolated environment within which to perform a variety of functions for the metrology device 22. By way of illustration, the smart card 24 could store cryptographic keys and encode/decode data and/or information for the metrology device 22. In one example, the smart card 24 could validate and authenticate newly downloaded Java applications for the metrology 22 along with providing access to cryptography services for application needing such services. In another example, the smart card 24 could allow the metrology 22 to distinguish between, say, electricity consumption during peak versus off-peak hours, and a different price/rate could be assigned accordingly. One advantage of performing these functions in the smart card 24 instead of the metrology device 22 is the metrology device 22 may be susceptible to probing or tampering, or its security otherwise compromised, whereas the smart card 24 is secure and tamper-resistant.

Figure 4:
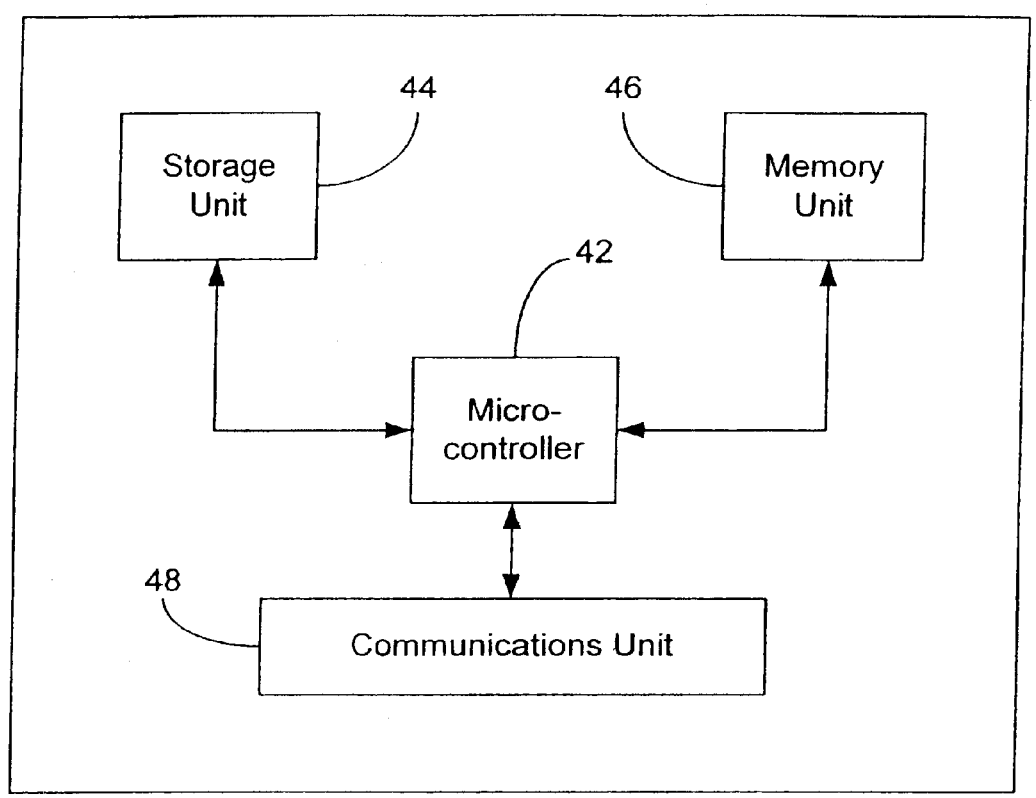
FIG. 4 is a block diagram of a programmable smart card.

Referring to FIG. 4, the programmable smart card 24 comprises a microcontroller 42 which is connected to a storage unit 44 and a memory unit 46. The microcontroller 42 executes smart card software and programs, carries out meter instructions, and generally manages the flow of data to and from the smart card 24. In some embodiments, the microcontroller 42 may include a microprocessor, a programmable array logic (PAL), an application-specific integrated circuit (ASIC), and/or other integrated circuit devices. The storage unit 44, which may include a read-only memory (ROM), stores the programs and data, that are needed to operate the smart card 24. The memory unit 46, which may include a random-access-memory (RAM), temporarily stores the programs and data used by the microcontroller 42 during program execution. New or updated programs, applications, or data may be downloaded or programmed into the smart card 24 from time to time to upgrade the smart card 24. Also, smart cards containing new or updated programs, applications, or data may be mailed to the desired locations and then inserted into a metrology device. The smart card 24 also has a communications unit 48 connected thereto which allows the microcontroller 42 to transfer data to and from external devices.

Figure 5:
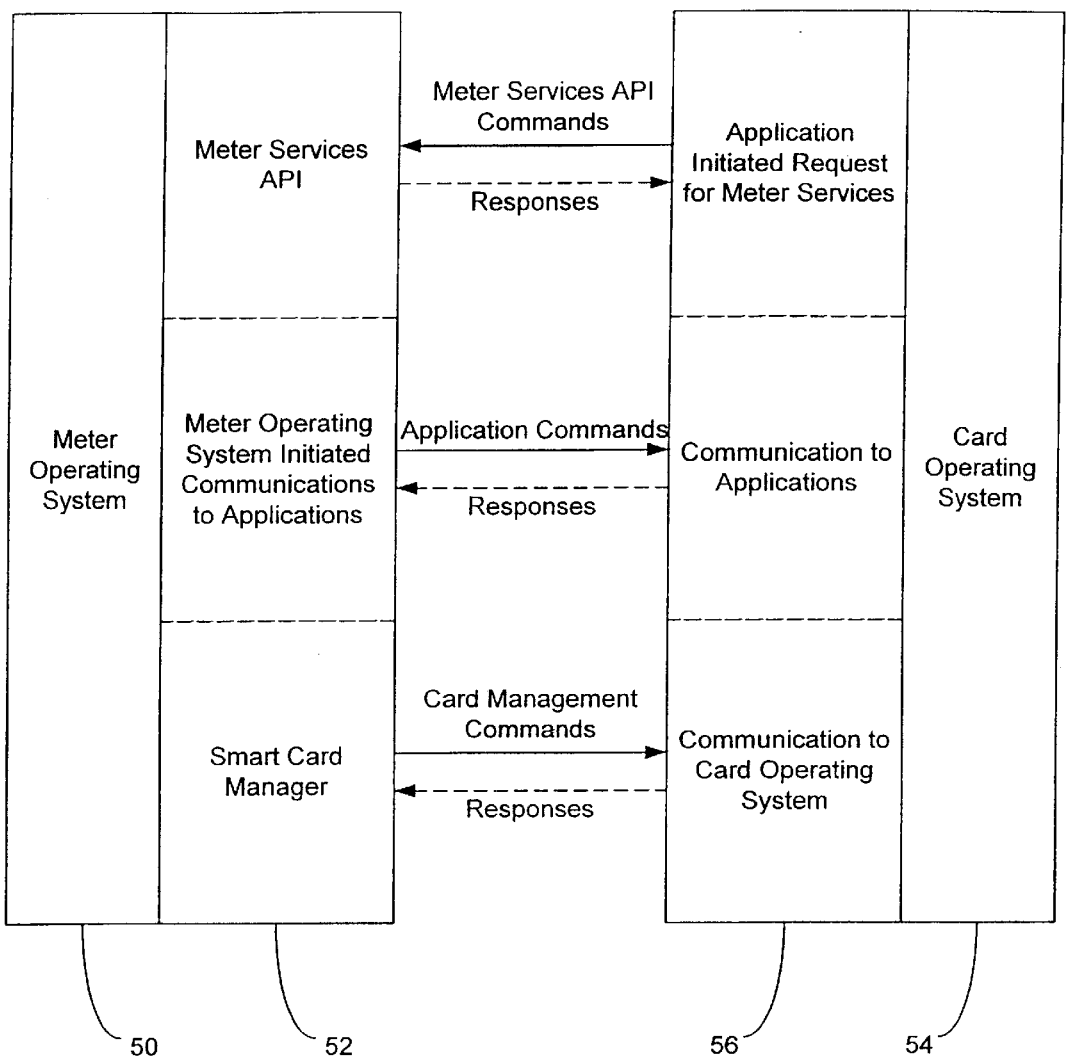
FIG. 5 is a block diagram of a metrology device operating system and a smart card operating system.

In another embodiment, in addition to a physical interface, the meter also has a software interface which isolates the operating system of the meter from the operating system of the smart card. Referring to FIG. 5, a meter has an operating system 50 and a defined interface 52. The meter interface 52 functions primarily to 1) manage the smart card, 2) initiate communications with Java applications, and 3) respond to requests for meter services by the Java application. Similarly, a smart card includes an operating system 54 and a smart card software interface 56 that functions primarily to: receive managerial or administrative commands and pass those commands onto the smart card operating system 54, receive Java application commands and pass those commands onto the Java applications, and send meter services requests from the Java applications to the meter.

In operation, for example, the meter operating system 50 may issue a managerial or administrative command to the smart card, such as a command to load a particular application. The meter interface 52 converts or otherwise changes the command to comply with the ISO 7816 protocol or other suitable protocols, and sends the command to the smart card (as shown by the solid line arrow). The smart card interface 56 receives the managerial or administrative command and passes it to the smart card operating system 54 which may then acknowledge the command or otherwise respond to the command (as shown by the dashed line arrow). The meter interface 52 also allows the meter operating system 50 to initiate communication with a selected application, for example, a Java application on the smart card and to instruct the application to perform one or more specific tasks. The smart card interface 56 receives the instruction and passes it to the appropriate application which may then acknowledge or otherwise respond to the instruction. Once an application is selected and activated, the application may call on the meter to provide a certain metrological service. The application may simply issue a request for that service, and the smart card interface 56 then converts the request into the appropriate protocol and sends the request to the meter. The meter interface 52 receives the metrological service request and passes it to the meter operating system 50. The meter operating system 50 determines whether the metrological service is available and causes the appropriate service to be performed. The results of the service are then sent to the application through the meter interface 52.

The software meter interface 52 allows the meter to access the smart card's programmability, applications, and resources while still allowing the meter to carry out its metrological functions independently of the smart card. The meter is able to operate normally with or without the smart card, and the smart card's programmability and functionality become available to the meter only when the smart card is inserted, installed, or otherwise connected to the meter. This arrangement has the advantage in that any functionality introduced into the meter by the applications can be easily proven (type tested) to not affect the accuracy of the metrological functions of the meter, thereby not compromising the meter's certification.

Similarly, the ability of the smart card to download and run applications independent of the meter is not affected. The applications could also be pre-loaded on the smart card prior to insertion or installation in the meter.

Figure 6:
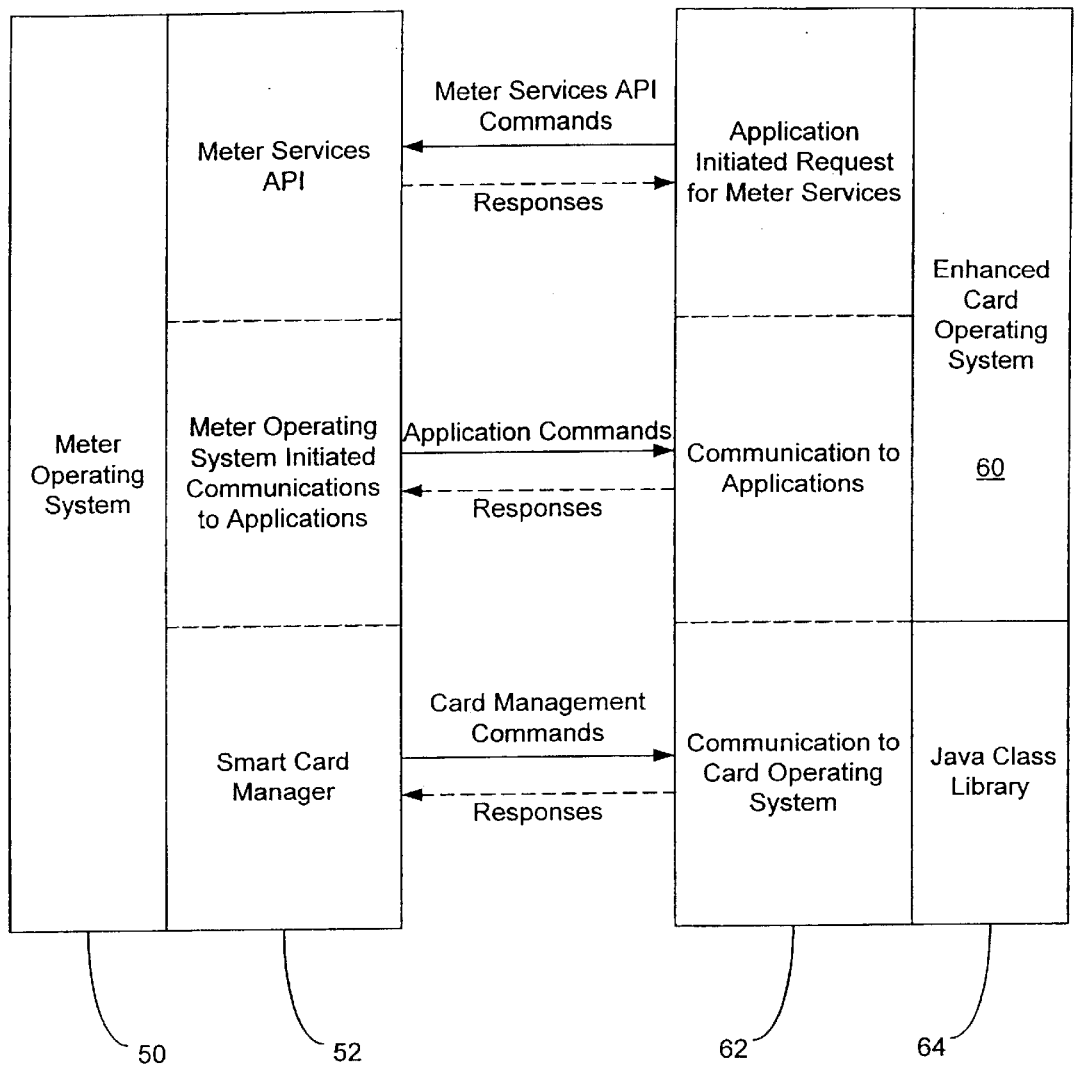
FIG. 6 is a block diagram of a metrology device operating system and an enhanced smart card operating system.

In yet another embodiment, referring to FIG. 6, a smart card operating system 60, for, for example, a Java programmable smart card, may have various metrological functions built-in to the operating system 60. For example, if one or more metrology related mathematical calculations (e.g., average daily use) are repeatedly performed by one or more Java applications, the calculations may be incorporated into the smart card operating system 60 as native functions of the operating system 60. The functions may then be available to all Java applications and may be run directly from the operating system 60 instead of in the Java application which requires a Java Virtual Machine to interpret the application. This arrangement has the advantage of being much faster because the functions are executed rather than interpreted. Also, the functions may require less storage space as a part of the operating system 60 compared to a Java application, although the size of the operating system 60 may increase. In an alternative embodiment, the functions could be implemented as a part of a Java class library 64 which may then be made available to all applications.

It is to be understood that the embodiments described herein are illustrative only, and that other embodiments may be derived by one of ordinary skill in the art without departing from the scope of the invention. For example, referring to FIG. 2, the control circuit 26, metrology unit 28, I/O unit 30, display unit 32, sensors 34, and smart card interface 36 may all be combined into a single integrated circuit device, or an otherwise smaller or larger number of integrated circuit devices.

What is claimed is:

1. A utility metrology device, comprising:
   a metrology unit for metering usage of a commodity selected from the set having the members electricity, gas, and water;
   a control circuit connected to the metrology unit;
   a smart card interface connected to the control circuit,
   wherein the control circuit is configured to:
      i) communicate with a programmable smart card through the smart card interface;
      ii) send commands to the programmable smart card;
      iii) select an application to be run on the programmable smart card;
      iv) instruct said application to perform a specific task;
      v) execute a command from the programmable smart card; and
      vi) perform the appropriate service corresponding to said command from the programmable smart card; and
   a meter operating system that controls the operation of the utility metrology device, said meter operating system being isolated from a smart card operating system.

2. The utility metrology device of claim 1, wherein the control circuit is configured to communicate with a programmable smart card that is programmable in a high level language.

3. The utility metrology device of claim 1, wherein the smart card interface enables full-duplex communication between the programmable smart card and the control circuit.

4. The utility metrology device of claim 1, wherein the control circuit initiates communications with the programmable smart card.

5. A utility metrology system which may be reprogrammed comprising:
   a metrology device including:
      a metrology unit for metering usage of a commodity selected from the set having the members electricity, gas and water;
      a control circuit connected to the metrology unit; and
      a smart card interface connected to the control circuit,
      wherein the control circuit is configured to:
         i) communicate with a programmable smart card through the smart card interface;
         ii) send a command to the programmable smart card;
         iii) select an application to be run on the programmable smart card;
         iv) instruct said application to perform a specific task;
         v) execute a command from the programmable smart card; and
         vi) perform the appropriate service corresponding to said command from the programmable smart card; and
      a meter operating system that controls the operation of the device, said meter operating system being isolated from a smart card operating system; and a programmable smart card connected to the metrology device and operable to communicate therewith via said smart card interface, said programmable smart card including said smart card operating system.

6. The utility metrology system of claim 5, further comprising a metrology device housing, wherein the programmable smart card is housed within the metrology device housing.

7. The utility metrology system of claim 6, wherein the programmable smart card is selectively removable from the metrology device housing.

8. The utility metrology system of claim 5, wherein the programmable smart card is a smart card programmable in a high level language.

* * * * *